(12) United States Patent
Ogino et al.

(10) Patent No.: US 6,359,905 B1
(45) Date of Patent: Mar. 19, 2002

(54) METHOD AND APPARATUS OF DETECTING SPECTRUM SPREAD SIGNAL

(75) Inventors: Akira Ogino; Hisayoshi Moriwaki, both of Tokyo; Yuji Kimura, Kanagawa; Takashi Kohashi; Nozomu Ikeda, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/143,387

(22) Filed: Aug. 28, 1998

(30) Foreign Application Priority Data

Sep. 1, 1997 (JP) .............................................. 9-235788

(51) Int. Cl.$^7$ ................................................ H04J 13/02
(52) U.S. Cl. ........................ 370/479; 360/60; 380/203; 386/94
(58) Field of Search ........................ 370/479; 348/473; 360/60; 375/147; 380/203; 386/94

(56) References Cited

U.S. PATENT DOCUMENTS 5,982,977 A * 11/1999 Naruse et al. ................. 386/64
6,112,008 A * 8/2000 Sugita et al. .................. 386/94
6,204,981 B1 * 3/2001 Ogino et al. ................... 360/60
6,271,887 B1 * 8/2001 Ogino et al. ................. 348/478
6,282,654 B1 * 8/2001 Ikeda et al. .................. 713/200

* cited by examiner

Primary Examiner—Melvin Marcelo
(74) Attorney, Agent, or Firm—Jay H. Maioli (57) ABSTRACT

In an SS additional information detecting unit, detection of a correlation between an image signal Si superimposed with a copying preventive control signal which is spectrum-spread and a PN code series is carried out at every vertical section. In the case where a correlation value between the copying preventive control signal which is superimposed on the image signal Si and is spectrum-spread and a PN code for inverse spreading does not exceed a predetermined threshold value, the correlation value calculated at every vertical section is added. The copying preventive control signal which is spectrum-spread and is superimposed on the image signal is detected by changing the threshold value of whether the correlation between the copying preventive control signal which is superimposed on the image signal Si and is spectrum-spread and the PN code for inverse spreading is established in accordance with a number of vertical sections constituting an object of detecting the correlation. Thereby, the spectrum spread signal can be detected even in the case where the spectrum spread signal is deteriorated.

12 Claims, 10 Drawing Sheets

FIG. 5A  VERTICAL SYNCHRONIZING SIGNAL VD

FIG. 5B  SPREAD SYNCHRONIZING TIMING SIGNAL TM

FIG. 5C  PN CODE SEQUENCE PS

ADDITIONAL INFORMATION SPECTRUM
BEFORE SPECTRUM SPREADING

FIG. 7B

ADDITIONAL INFORMATION SPECTRUM
AFTER SPECTRUM SPREADING

FIG. 7C

SPECTRUM OF INFORMATION SIGNAL SUPERIMPOSED WITH SS ADDITIONAL SIGNAL

FIG. 7D

SIGNAL SPECTRA AFTER INVERSE SPECTRUM SPREADING ON RECORDING APPARATUS SIDE

METHOD AND APPARATUS OF DETECTING SPECTRUM SPREAD SIGNAL

FIELD OF THE INVENTION

The present invention relates to a method and an apparatus for detecting a spectrum spread signal of an additional information signal superimposed on a main information signal of an image signal by being spectrum-spread.

BACKGROUND OF THE INVENTION

Digital information apparatuses such as a digital VTR (Video Tape Recorder), MD (Minidisc) recording and reproducing apparatuses have been spread and further, DVD (Digital Video Disc or Digital Versatile Disc) apparatuses having recording function have shown up. According to the digital information recording apparatuses, various additional information signals can be recorded by being added to a digital image signal or a digital audio signal as well as data for a computer or the like as a major information signal.

Figure 1:
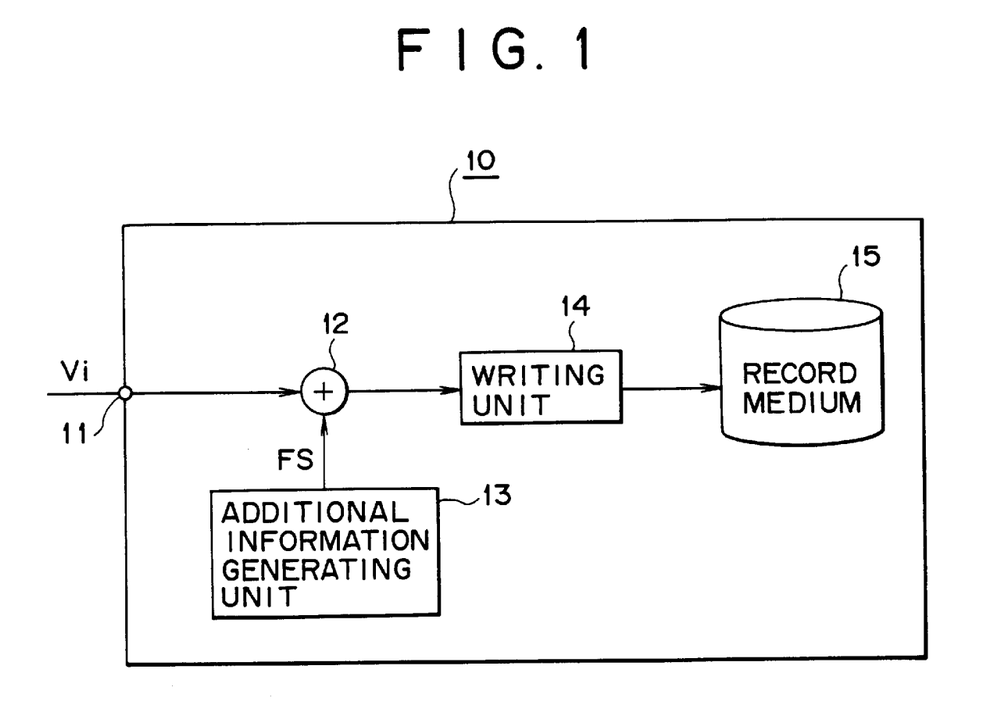
FIG. 1 is a diagram showing a conventional example in which an additional information signal is added to a main information signal.

FIG. 1 shows an example of a constitution of a conventional recording apparatus for recording an additional information signal by adding it to a digital information signal. According to the recording apparatus in FIG. 1, a digital information signal Vi is supplied to a recording apparatus 10 via an input terminal 11 and in the recording apparatus 10, an additional information signal is added to the digital information signal Vi and stored to a record medium 15.

According to the recording apparatus 10, at an adding unit 12, the additional information signal from an additional information generating unit 13 is added to the digital information signal Vi. In this case, the additional information signal is a digital signal and is added to the digital information signal Vi by being recorded to an area which is differentiated from the digital information signal in view of area of, for example, a header portion added to data of a block unit, or other area of TOC (Table of Contents) in the digital information signal.

The digital information signal added with the additional information signal from the adding unit 12 is recorded on the record medium 15 such as a tape or a disc by a writing unit 14. In this case, when compressed code formation of the digital information signal is needed as mentioned above, a processing of the compressed code formation is carried out at the writing unit 14.

As described above, in the case of the conventional recording system of additional information signal, the additional information signal is not directly superimposed on the digital information signal of the header portion or the like but is added to an indirect portion. Therefore, the additional information signal is removed comparatively easily by filtering or alteration and in a recording apparatus or a reproducing apparatus, necessary additional information signal may not be detected. Particularly, when as an additional information signal, control information for preventing unfair copying, copy right information or the like is added, for removing such an additional information signal, a state where an original object cannot be achieved is brought about.

Further, in the case where an additional information signal is added to an indirect portion as mentioned above, when a digital information signal is converted into an analog signal, only a main information signal is obtained and therefore, the additional information signal is detached. Thereby, even when a copying preventive control signal as mentioned above is superimposed by which a countermeasure capable of preventing a digital information signal from being unfairly copied, is provided, when the digital signal is converted into an analog signal, the copying preventive countermeasure is no more effective.

As a system of superimposing an additional information signal for resolving the problem of detachment of the additional information signal and the problem which is caused when the digital signal is converted into an analog signal as mentioned above, the applicant has proposed a system where an additional information signal such as a copying preventive control signal or the like is spectrum-spread and the spectrum-spread additional information signal is superimposed on an image signal and the image signal is recorded by digital recording or analog recording (U.S. patent application Ser. No. 08/75510).

According to the system, a code of PN (Pseudorandom Noise) series which is used as a spread code, is generated at sufficiently high rate and is multiplied with an additional information signal to thereby spectrum-spread the code and the additional information signal of a copying preventive control signal or the like having a narrow band at a high level is converted into a signal having a wide band at a very small level which does not effect influence on an image signal or a vocal signal. Further, the additional information signal which has been spectrum-spread, that is, the spectrum spread signal is superimposed on an analog image signal and is recorded in a record medium. In this case, either of an analog and a digital signal is feasible as an image signal recorded in a record medium.

According to the system, an additional information signal of a copying preventive control signal or the like is spectrum-spread and is superimposed on an image signal as a signal at a very small level and therefore, it is difficult for, a person trying to illegally copy the signal to remove the superimposed copying preventive control signal from the image signal.

In the meantime, the additional information signal such as a superimposed copying preventive control signal or the like can be detected and utilized by subjecting the signal to inverse spectrum spreading. Accordingly, for example, not only is the copying preventive control signal firmly provided to the side of a recording apparatus along with the image signal but also on the side of the recording apparatus, the copying preventive control signal can be detected and decoding control, in accordance with the detected copying preventive control signal, can firmly be carried out.

As mentioned above, in reproducing the main information signal, the additional information signal superimposed on the main information signal such as an image signal, cannot be removed from the main information signal and accordingly, a spectrum spread signal needs to superimpose at a very small level which does not effect influence on a reproduced output of the main information signal.

However, when the spectrum spread signal is superimposed on the main information signal at such a very small level, it is important that the spectrum spread signal can be detected firmly from the main information signal.

An evaluation function $\lambda$ in the case of inverse spectrum spreading where a spectrum spread signal is detected from a signal Si produced by superimposing a spectrum spread signal on a main information signal is specified as follows.

$$\lambda = \Sigma si \cdot pi$$

$$= \Sigma(Vi + ki \cdot pi)pi$$

$$= \Sigma Vi \cdot pi + \Sigma ki \cdot pi \cdot pi \tag{1}$$

where notation Vi designates a main information signal such as an image signal or the like, notation pi designates a spread code such as a PN code or the like and notation ki designates a coefficient, respectively.

In Equation (1), the first term represents correlation between the main information signal and the spread code and the second term represents correlation between the spectrum spread signal and the spread signal. It is known from Equation (1) that when there is no correlation between the main information signal and the spread signal, the spectrum spread signal can easily be detected.

However, actually, the main information signal such as an image signal or the like is not uncorrelated with the spread code. That is, when the main information signal is a flat signal having no change, the main information signal is not correlated with the spread code, however, a general main information signal is changed in accordance with content of information and therefore, it cannot be uncorrelated with a PN code.

Therefore, in the case where a spectrum spread signal superimposed on a main information signal is deteriorated by, for example, undergoing influence of a low pass characteristic of a transmission path, the correlation between the spectrum spread signal and the PN code becomes low, influence of a degree of correlation between the main information signal and the PN code becomes large and the spectrum spread signal may be difficult to detect.

It is an object of the present invention in view of the above-described points to provide a method and an apparatus capable of firmly detecting a spectrum spread signal even in the case where the spectrum spread signal is deteriorated and a correlation value between the spectrum spread signal and a spread code becomes low.

SUMMARY OF THE INVENTION

According to an aspect of the present invention, there are provided a method and an apparatus for detecting an additional information signal from a main information signal with additional information which is formed by superimposing a spectrum spread signal which is formed by spectrum-spreading the additional information signal by a spread code generated at a period in synchronism with a synchronizing signal on the main information signal including the synchronizing signal wherein a spread code the same as the above-described spread code is generated in synchronism with the synchronizing signal included in the main information signal with additional information, the main information signal with additional information is subjected to inverse spectrum spreading by the spread code, a correlation value is formed, the correlation value is compared with a predetermined threshold level, when the correlation value is larger than the predetermined threshold level, the additional information signal is detected from the main information signal with additional information, when the correlation value is smaller than the predetermined threshold level, the correlation value is added at every period during a plurality of periods of the spread code, the threshold level is increased from the predetermined threshold by a predetermined amount of increase at every period of the spread code and when the added correlation value becomes larger than the increased threshold level, the additional information signal is detected from the main information signal with additional information.

In this way, in the case where a spectrum spread signal superimposed on an information signal such as an image signal or the like cannot be detected, correlation values each of which is calculated at every section of a synchronizing period, are added and a threshold for detecting correlation is rendered an appropriate value in accordance with a number of the sections of the synchronizing period which become an object of adding the correlation values by which the spectrum spread signal which cannot be detected by deterioration can be detected.

Thereby, even in the case where the spectrum spread signal superimposed on the image signal is deteriorated and the spectrum spread signal cannot be detected, the spectrum spread signal can firmly be detected.

DESCRIPTION OF THE PREFERRED EMBODIMENT

An explanation will be given of embodiments of a method and an apparatus of detecting a spectrum spread signal according to the present invention in reference to the drawings as follows. According to the embodiments explained below, a main information signal is a digital image signal and a spectrum spread signal in which an additional information signal of, for example, a copying preventive control signal which is superimposed to add on the digital signal is detected. Further, in respect of the embodiments, an explanation will be given of a case where an image signal superimposed with a spectrum spread signal is recorded in a record medium, for example, a DVD disc and the image signal added with the spectrum spread signal is reproduced from the DVD disc and is copied to record on other unrecorded DVD disc.

First, before explaining the embodiments of the present invention, an explanation will be given of recording of an image signal superimposed with a spectrum spread signal onto a record medium, for example, DVD disc.

Further, although in the following embodiments, a spectrum spread signal can be superimposed on a color signal, the spectrum spread signal is superimposed on a brightness signal Y in an image signal and is not superimposed on a color signal C. This is because in transmitting the color signal of the image signal, the transmission is carried out by components of two phase axes of, for example, a color difference signal or the like and color is reproduced by phases of the two axes and accordingly, when the spectrum spread signal is superimposed on the color signal, a change in hue is brought about even when the spectrum spread signal is at a very small level, hence, it is comparatively conspicuous and it is difficult to superimpose the spectrum spread signal on the color signal with no influence on the change in hue. Incidentally, for simplifying explanation, in the following explanation, the brightness signal Y and the color signal C are not differentiated from each other and expression of image signal will be used.

Figure 2:
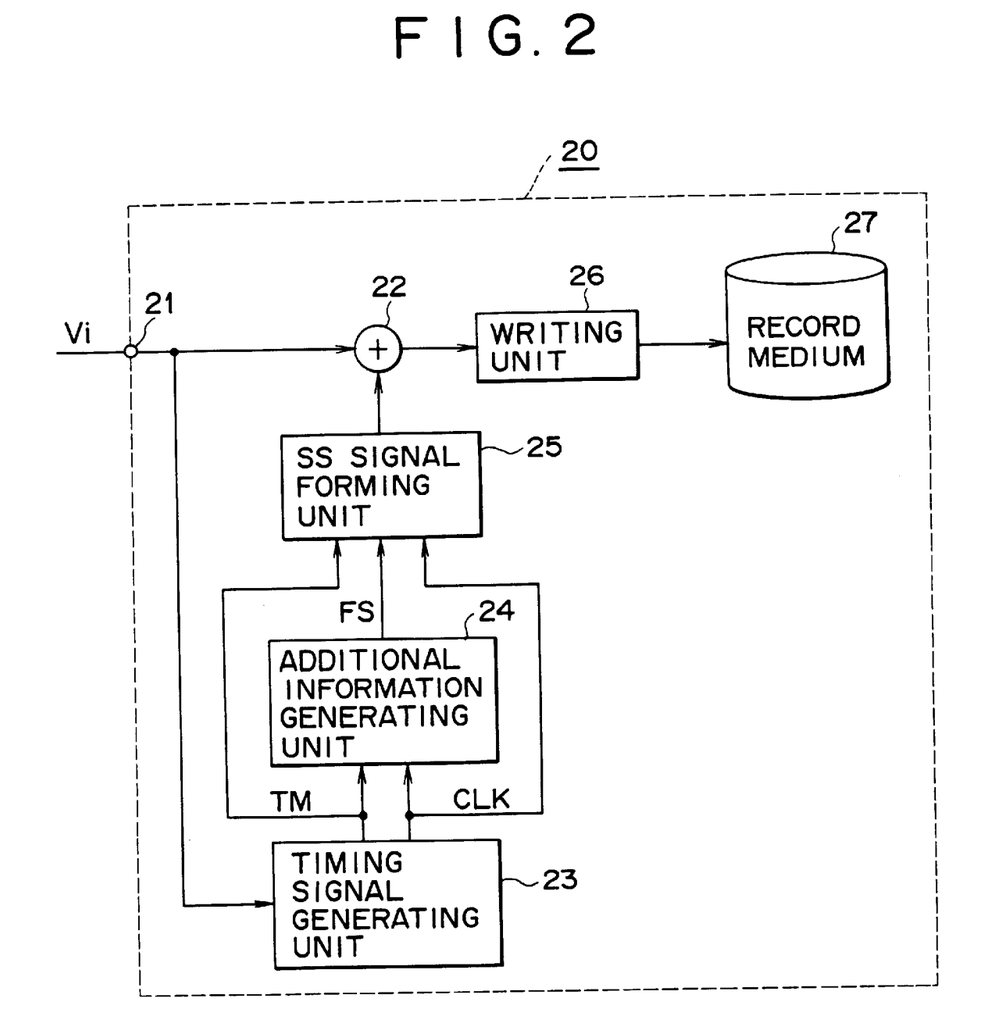
FIG. 2 is a diagram for explaining a recording system for superimposing a spectrum spread signal on a main information signal and recording a superimposed signal.

FIG. 2 shows an example of a recording apparatus for recording an image signal to a DVD disc which is used by, for example, a production company or the like. A digital image signal Vi is inputted via an input terminal 21 of a recording apparatus 20.

The recording apparatus 20 is constituted by a superimposing unit 22, a timing signal forming unit 23, an additional information generating unit 24, a spectrum spread signal forming unit 25 (hereinafter, abbreviated as SS signal forming unit), a writing unit 26 and a DVD disc 27 as a record medium.

The digital image signal Vi from a reproducing apparatus 10 is supplied to the superimposing unit 22 and the timing signal forming unit 23.

Figure 3:
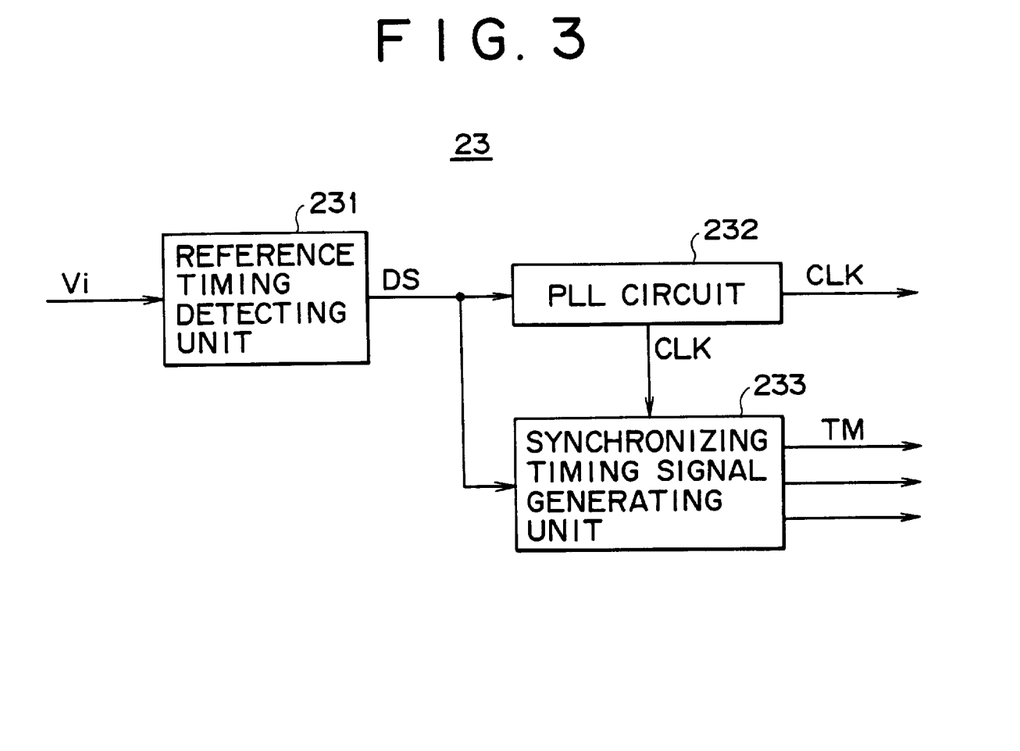
FIG. 3 is a block diagram of a portion of the system of FIG. 2.

The timing signal forming unit 23 forms a timing signal in synchronism with timing of an image synchronizing signal detected from the digital image signal Vi and can be constituted by, for example, a reference timing detecting unit 231, a PLL (Phase Locked Loop) circuit 232 and a synchronizing timing signal generating unit 233 as shown by FIG. 3.

Figure 5A:
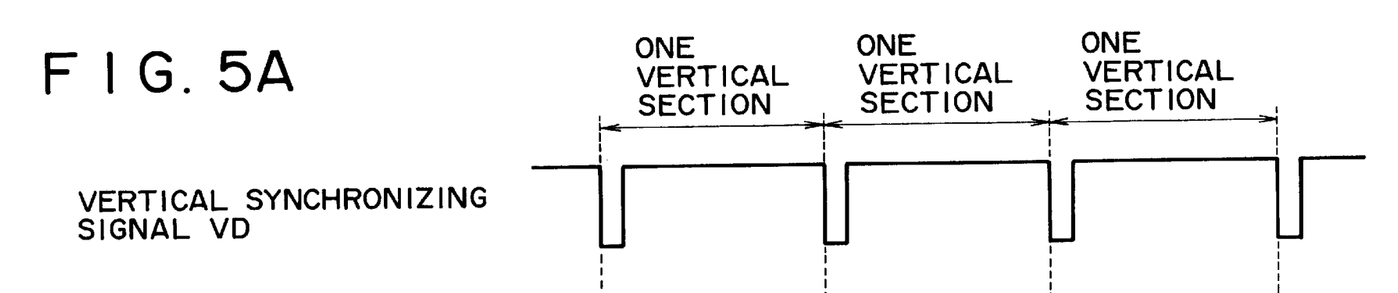
FIGS. 5A, 5B and 5C are diagrams showing time charts of spread synchronization of the recording system shown by FIG. 2.

The reference timing detecting unit 231 forms an image synchronizing timing signal DS as a reference timing signal from the digital image signal Vi. According to the embodiment, a vertical synchronizing signal VD is used as the reference timing signal and the reference timing detecting unit 231 forms the signal DS showing timing of the vertical synchronizing signal VD (refer to FIG. 5A) from the digital image signal Vi and supplied it to the PLL circuit 232 and the timing signal generating unit 233.

The PLL circuit 232 forms a clock signal CLK in synchronism with timing of the vertical synchronizing signal VD. The clock signal CLK is supplied to the timing signal generating unit 233 and supplied also to the additional information generating unit 24 and the SS signal forming unit 25.

Figure 5B:
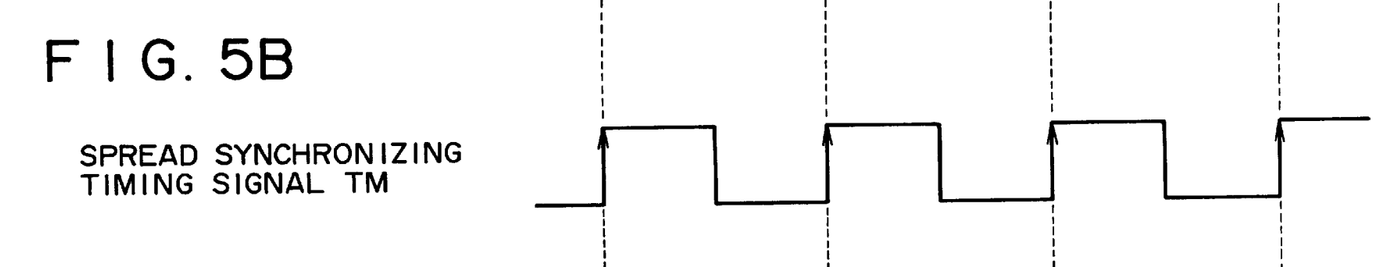

The timing signal generating unit 233 forms a spread synchronization timing signal (refer to FIG. 5B) based on the signal DS in synchronism with timing of the vertical synchronizing signal VD and supplies the spread synchronization timing signal TM to the additional information generating unit 24 and the SS signal forming unit 25. Further, the timing signal generating unit 233 forms other necessary various timing signals and supplies them to necessary portions.

The additional information generating unit 24 is provided with a storing unit for storing the additional information signal FS intended to superimpose on the image signal Vi and the additional information signal FS is previously stored to the storing unit.

As the additional information signal FS, there is pointed out control information such as copying preventive control or the like, information related to a digital image signal, for example, time code information for identifying respective fields, a copying preventive signal such as copyright information or the like, and the like as examples. As copyright information, for example, an apparatus number for specifying the recording apparatus 30 is used. When the apparatus number is recorded by being superimposed on the digital image signal Vi, copied history can easily be traced. According to the embodiment, as the additional information signal FS, a copying preventive control signal mentioned above is used and the additional information generating unit 24 is provided with, for example, ROM (Read Only Memory) where the copying preventive control signal is stored.

The additional information generating unit 24 forms a read signal in synchronism with the spread synchronization timing signal TM and the clock signal CLK supplied thereto and outputs the additional information signal FS to be superimposed on the digital image signal Vi by the read signal and supplies it to the SS signal forming unit 25. In this case, the additional information signal FS is supplied to the SS signal forming unit 25 as additional information signal series by the clock CLK.

The spread synchronization timing signal TM is a synchronization timing signal of PN code series used in spectrum-spreading the additional information signal FS and the spread synchronization timing signal TM is formed as a signal in synchronism with the vertical synchronizing signal VD with one vertical section as one period.

The SS signal forming unit 25 forms PN (Pseudorandom Noise) code series as a spread code and spectrum-spreads the additional information signal FS from the additional information generating unit 24 by using the PN code series.

Figure 4:
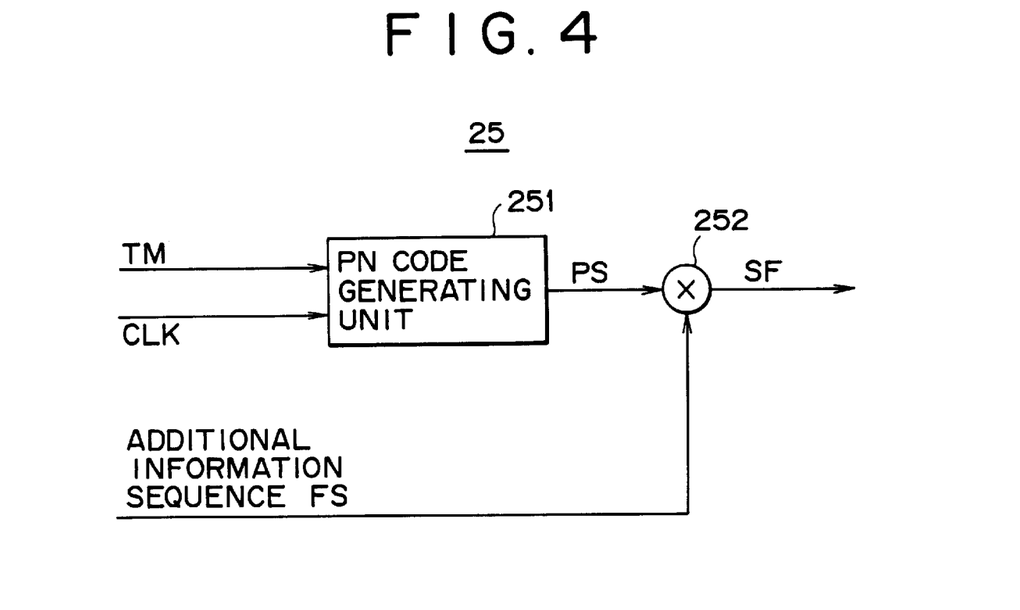
FIG. 4 is a block diagram of a portion of the system of FIG. 2.

FIG. 4 is a diagram showing an example of the constitution of the SS signal forming unit 25. As shown by FIG. 4, the SS signal forming unit 25 is provided with a PN code series generating unit 251 and a multiplier 252.

The PN code series generating unit 251 is supplied with the clock signal CLK, an Enable signal EN and the spread synchronization timing signal (initializing signal) TM. The Enable signal EN is a signal for bringing the PN code series generating unit 251 into an operational state and the Enable signal EN is formed by switching in power source to the recording apparatus 30 shown in FIG. 8 and is supplied to the PN code series generating unit 251.

Figure 5C:
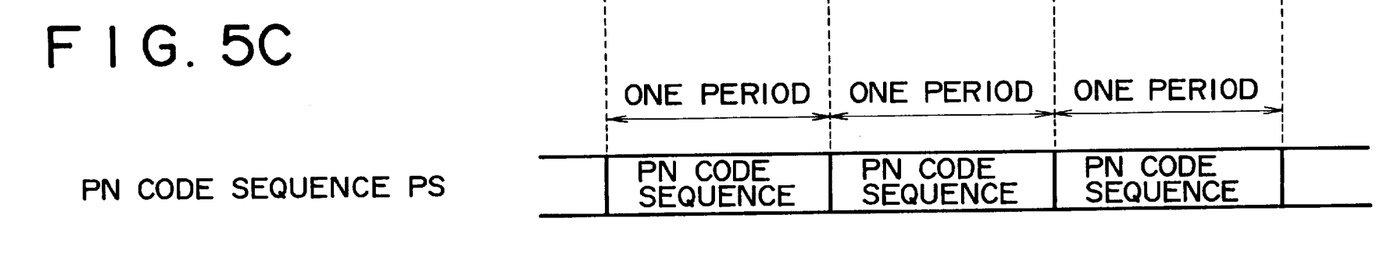

The PN code series generating unit 251 is brought into a state where the operation is enabled in accordance with the Enable signal EN. Further, the PN code series generating unit 251 is reset by the spread synchronization timing signal TM and forms PN code series from its front end and generates PN code series PS (refer to FIG. 5C) in synchronism with the clock signal CLK.

Figure 6:
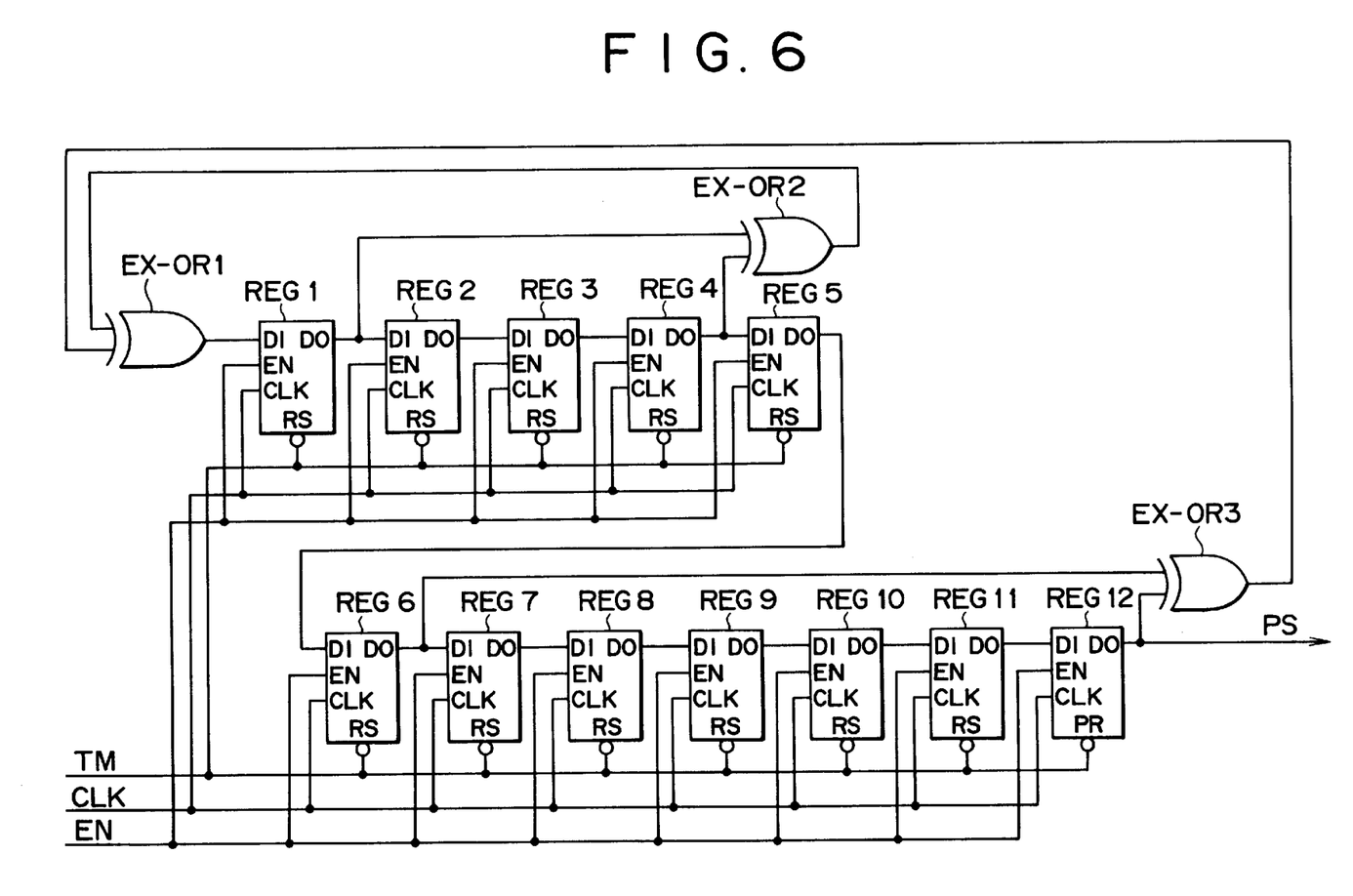
FIG. 6 is a diagram showing a portion of a PN code generating unit.

FIG. 6 is a diagram showing an example of the constitution of the PN code series generating unit 251. The PN code series generating unit 251 in this example is constituted by, for example, 12 of D flip flops REG1 through REG12 constituting 12 stages of shift registers and Exclusive Or Circuits EX-OR1 through EX-OR3 calculating pertinent tap outputs of the shift registers. Further, the PN code series generating unit 251 shown by FIG. 6 generates the PN code series PS of M series based on the spread synchronization timing signal TM, the clock signal CLK and the Enable signal EN as mentioned above.

The PN code series PS formed by the PN code series generating unit 251 is supplied to the multiplier 252. In the meantime, the additional information signal series FS from the additional information generating unit 24 is supplied to the multiplier 252.

The multiplying unit 252 spectrum-spreads the additional information signal FS by using the PN code series PS from the PN code series generating unit 251. A spectrum spread signal SF which is a signal produced by spectrum-spreading the additional information signal FS, is obtained from the multiplying unit 252.

In this way, a spectrum spread signal SF formed by the SS signal forming unit 25 is supplied to the superimposing unit 22. The superimposing unit 22 carries out a processing of superimposing the spectrum spread signal on the digital image signal Vi. Further, the digital image signal superimposed with the spectrum spread signal is supplied to the writing unit The writing unit 26 carries out a processing of necessary compressed code formation or the like with respect to the digital image signal superimposed with the spectrum spread signal from the superimposing unit 22 and thereafter records it to the record medium 27.

In this case, as mentioned above, when the image signal is supplied to a monitor and an image is displayed, the spectrum spread signal is superimposed on the digital image signal Vi at a very small level which does not disturb the image. For example, in the case where one pixel is represented by 8 bits, the spectrum spread signal is added to and superimposed on the lowest bit or a bit next thereto of the digital image signal of the 8 bit sample.

Figure 7A:
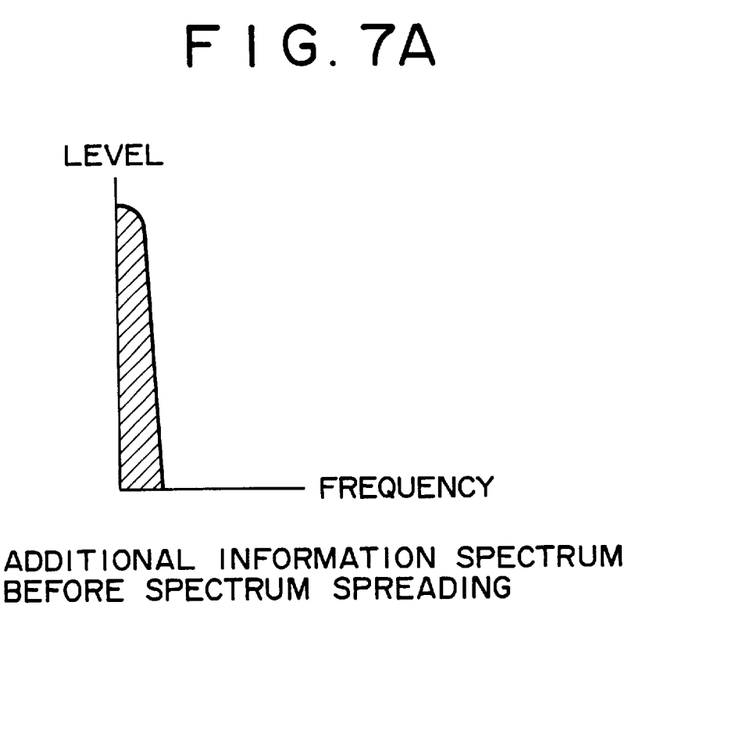
FIGS. 7A, 7B, 7C and 7D are diagrams for explaining spectrum spreading of additional information added to a main information signal.
Figure 7B:
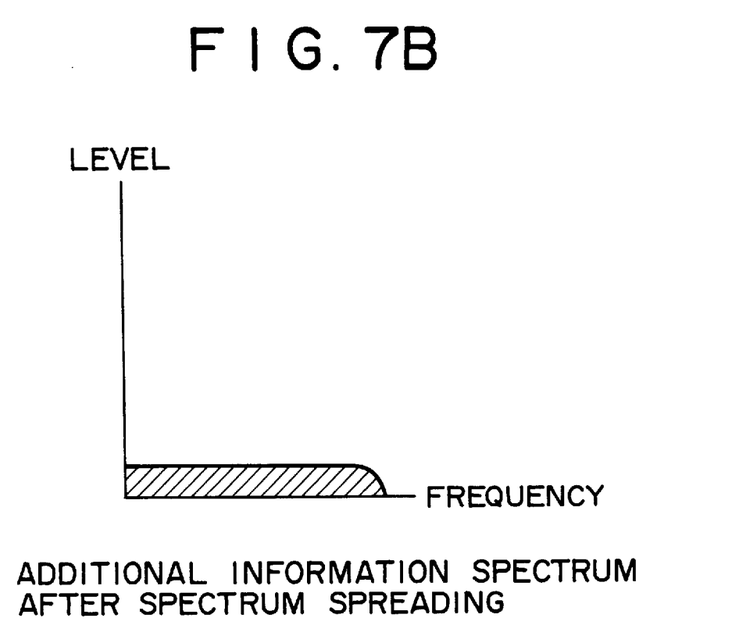

FIGS. 7A, 7B, 7C and 7D are diagrams showing a relationship between the spectrum-spread signal and the image signal by spectra. The additional information signal is a signal at a low bit rate having a small amount of information and is a signal of a narrow band as shown by FIG. 7A. When the spectrum spreading is carried out thereon, a signal having a wide band width is constituted as shown by FIG. 7B. In this case, a spectrum spread signal level is reduced in inverse proportion to a ratio of enlarging the band.

Figure 7C:
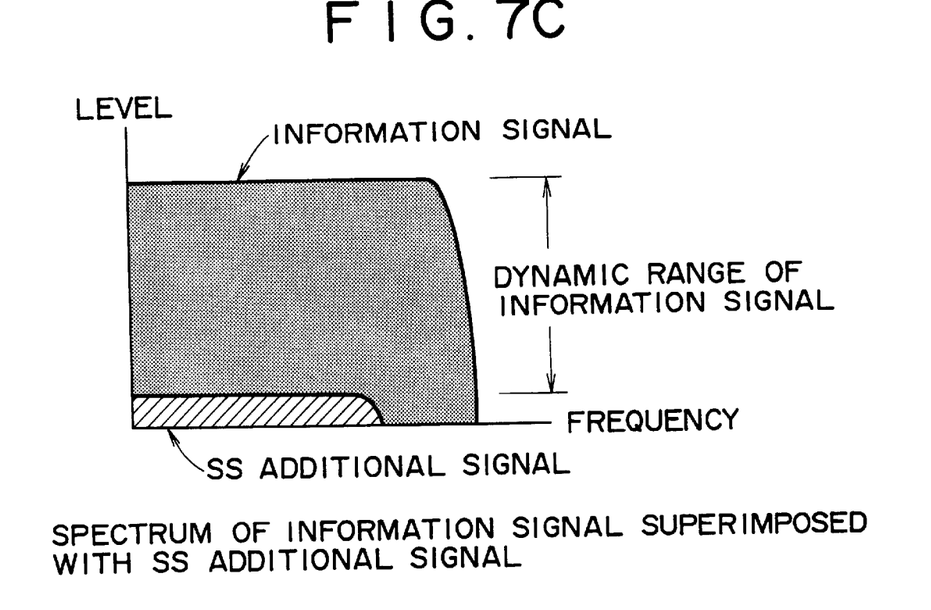

The spectrum spread signal is superimposed on the image signal at the superimposing unit 22 and in this case, as shown by FIG. 7C, the spectrum spread signal is superimposed at a level smaller than the dynamic range of the image signal. By superimposing the spectrum spread signal in this way, it is possible that almost no deterioration in the image signal is caused. Accordingly, in the case where the image signal superimposed with the spectrum spread signal is supplied to a monitor receiver and the image is reproduced, almost no influence of the spectrum spread signal is effected and excellent reproduced image is provided.

Figure 7D:
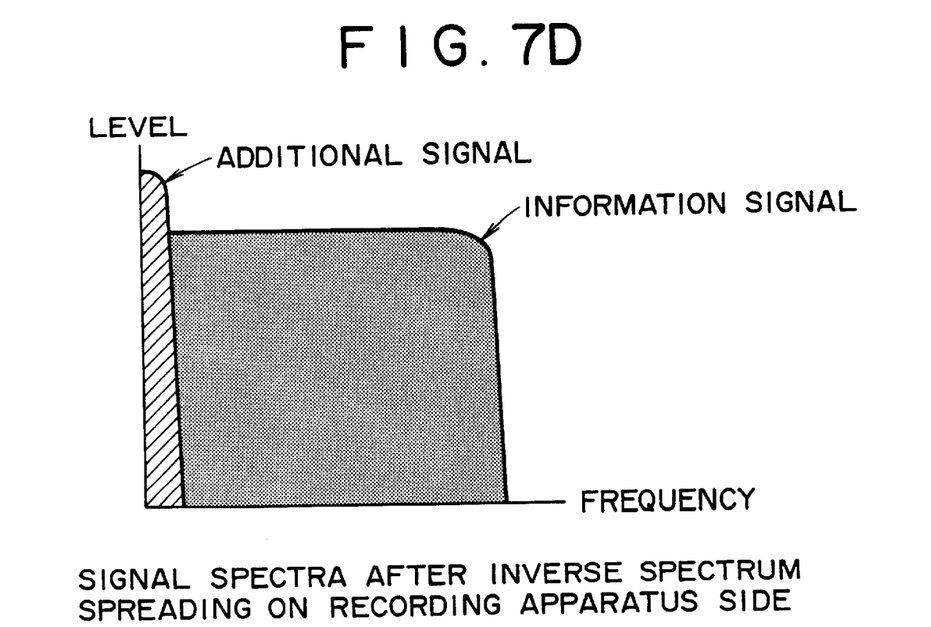

However, as mentioned later, when inverse spectrum spreading is carried out to detect the superimposed spectrum spread signal, as shown by FIG. 7D, the spectrum spread signal is restored again as a signal having a narrow band. By providing a sufficient rate of band spreading, power of the additional information signal after the inverse spreading exceeds that of the information signal and becomes detectable.

In this case, the additional information signal superimposed on the image signal cannot be deleted or modified only by a frequency filter or simple replacement of information since it is superimposed on the image signal in the same time and at the same frequencies.

Accordingly, by recording the necessary additional information signal by superimposing it on the information signal of image signal or the like, the additional information signal can firmly be transmitted along with the image signal. Further, as in the above-described embodiment, in the case where the spectrum-spread additional information signal is superimposed on the information signal by a signal power lower than that of the information signal such as the image signal, deterioration in the information signal can be minimized.

Accordingly, when an additional information signal, for example, a copying preventive signal is superimposed on an information signal such as an image signal or the like, the copying preventive signal is difficult to alter or remove as mentioned above and accordingly, copying preventive control capable of firmly preventing unfair copying can be carried out.

Further, according to the above-described constitution, the spectrum spreading is carried out by using the PN code series having a vertical period with the vertical synchronizing signal as a reference signal and accordingly, PN code series for inverse spectrum spreading necessary for detecting the spectrum spread signal from the digital image signal, can easily be formed based on a signal in synchronism with the vertical synchronizing signal detected from the digital image signal Vi. That is, synchronizing control of a PN code for the inverse spreading using, for example, a sliding correlator or the like is not necessary. In this way, the PN code series for inverse spreading can easily be formed and accordingly, the inverse spectrum spreading can swiftly be carried out and the additional information signal such as a copying preventive control signal or the like superimposed on the image signal can be detected by swift spectrum spreading.

Figure 8:
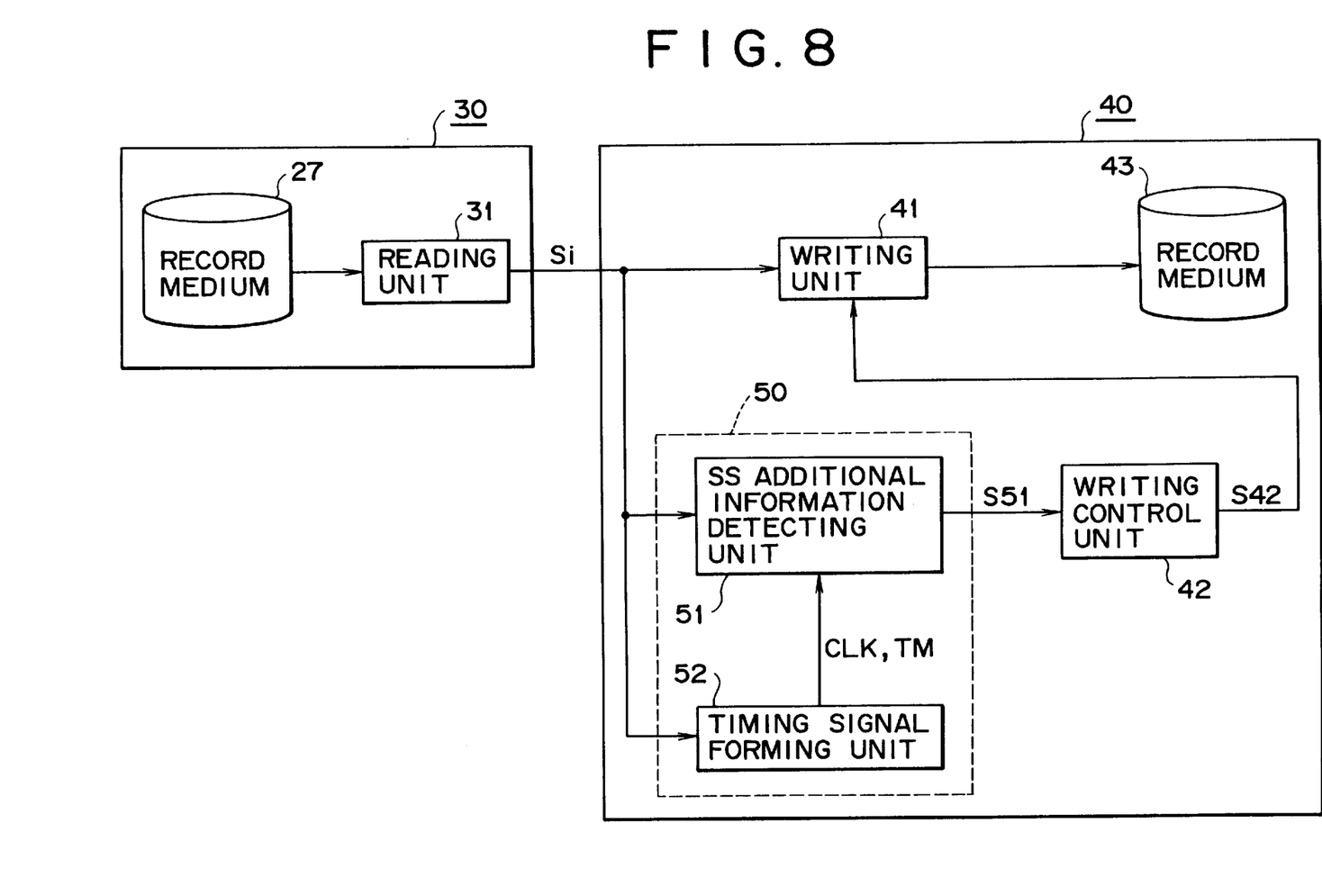
FIG. 8 is a block diagram showing an example of a system to which an embodiment of a spectrum spread signal detecting apparatus according to the present invention is applied.

FIG. 8 shows a constitution of a copying system of a digital image signal using a spectrum spread signal detecting apparatus according to the present invention and the constitution is provided with a reproducing apparatus unit 30 and a recording apparatus unit 40. Further, a digital image signal obtained by being reproduced from a record medium 27 by the reproducing apparatus unit 30 is supplied to the recording apparatus unit 40. In the recording apparatus unit 40, by a copying preventive control signal added to the digital image signal, the digital image signal is controlled to write (record) to a new record medium 43.

In FIG. 8, as mentioned above, in this example, the record medium 27 is recorded with the digital image signal superimposed with the copying preventive control signal by spectrum spreading as an additional information signal.

Information sampled from the record medium 27 is restored to digital information by a reading unit 31. In this case, for example, when the information is subjected to compressed code formation and recorded, the information signal is decompressed to decode at the reading unit 31. Further, a restored digital image signal Si is inputted to the recording apparatus unit 40.

In the recording apparatus unit 40, the digital image signal Si inputted thereto is supplied to a writing unit 41 and a spectrum spread signal detecting apparatus unit 50. In the spectrum spread signal detecting apparatus unit 50, a spectrum spread signal superimposed on the digital image signal Si is detected and the copying preventive control signal which is the additional information signal is restored. Further, the restored copying preventive control signal is supplied to a writing control unit 42.

The writing control unit 42 forms a control signal S42 for controlling the writing unit 41 based on a result of restoring the copying preventive control signal and supplies it to the writing unit 41. The control signal S42 controls to permit or prohibit to write the digital image signal to a record medium 43.

When the control signal S42 from the writing control unit 42 permits copying, the writing unit 41 writes the inputted digital image signal Si to the record medium 43 after carrying out a necessary processing for recording, for example, compressed code formation and when the control signal S42 prohibits copying, the writing unit 41 controls to prohibit to write the inputted digital image signal Si to the record medium 43.

The spectrum spread signal detecting apparatus unit 50 is constituted by a spectrum spread additional information detecting unit (hereinafter, referred to as SS additional information detecting unit) 51 and a timing signal forming unit 52. Incidentally, in the drawing, notation SS designates an abbreviation of spectrum spread.

Upon receiving the inputted digital image signal Si, the SS additional information detecting unit 51 carries out an inverse spectrum spread processing (hereinafter, simply referred to as inverse spread), detects and restores a copying preventive control signal S51 which is the additional information signal and supplies it to the writing control unit 42.

The timing signal forming unit 52 is provided with a constitution quite the same as that of the timing signal generating unit 23 in recording operation and the timing signal forming unit 52 samples a vertical synchronization timing signal from the inputted digital image signal Si and forms the clock signal CLK and the synchronization timing signal TM for generating the PN code. Further, the clock signal CLK and the synchronization timing signal TM are sent to the SS additional information detecting unit 52.

Figure 9:
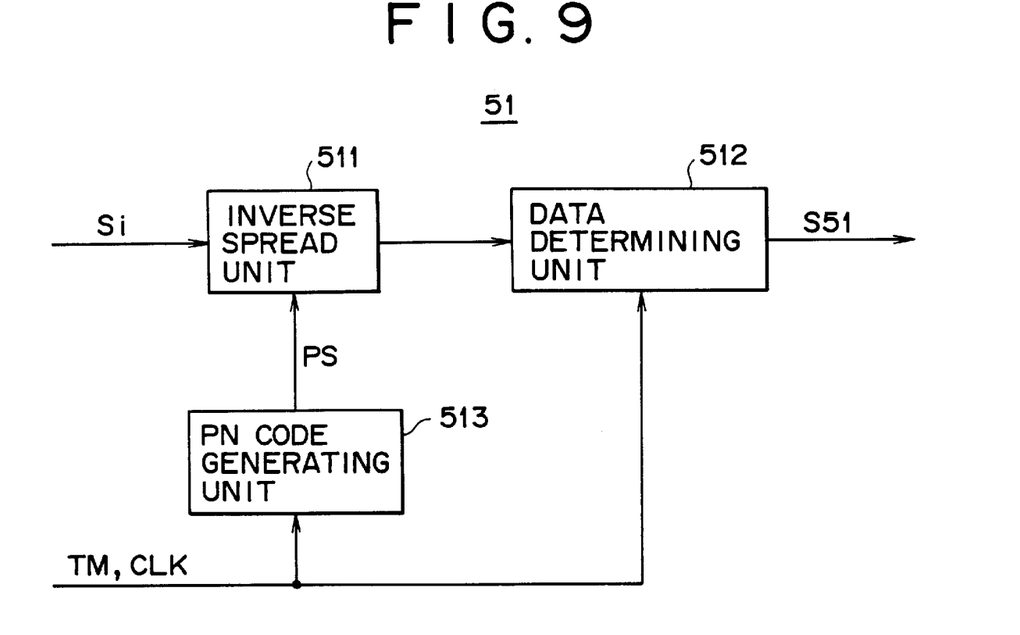
FIG. 9 is a diagram for explaining an SS additional information detecting unit of FIG. 8.

FIG. 9 is a block diagram for explaining the constitution of the SS additional information detecting unit 51 of the recording apparatus unit 40. As shown by FIG. 9, the SS additional information detecting unit 51 of this example is provided with an inverse spread unit 511 for detecting the copying preventive control signal as the additional signal which has been subjected to spectrum spreading from the supplied inputted digital image signal Si, a data determining unit 512 for restoring the copying preventive control signal detected by the inverse spread unit 511 into an original copying preventive control signal and a PN code generating unit 513 for generating a PN code for inverse spectrum spreading.

The PN code generating unit 513 is provided with a constitution similar to that of the PN code generating unit 251 (FIG. 4) of the spectrum spread signal generating unit 25 in FIG. 2 and the PN code generating unit 513 forms PN code series PS based on the clock signal CLK at every timing in accordance with the timing signal TM from the timing signal forming unit 52 and supplies the formed PN code series PS to the inverse spread unit 511.

The inverse spread unit 511 is supplied with the inputted digital image signal Si and PN code series PS formed by the PN code generating unit 513 and calculates a correlation between the inputted digital image signal Si and the PN code series PS by which the copying preventive control signal superimposed on the image signal which has been subjected to the spectrum spreading is detected.

The inputted digital image signal Si supplied to the inverse spread unit 511, is superimposed with the copying preventive control signal which has been subjected to spectrum spreading by the PN code series PS with one vertical section as one period as described above in reference to FIGS. 5A, 5B and 5C.

The PN code generating unit 513 generates the PN code series PS from its front end at every one vertical section and supplies it to the inverse spread unit 511 as in the case where the copying preventive control signal is subjected to spectrum spreading and is superimposed on the image signal by using the timing signal TM and the clock signal CLK as mentioned above.

In the inverse spread unit 511, a correlation is calculated between the PN code series PS which is a PN code series PS having a code pattern the same as that of the PN code series spectrum-spreading the copying preventive control signal which is superimposed on the image signal and spectrum-spread and which has the same generating timing, and the inputted digital image signal Si. That is, the inverse spread unit 511 detects the copying preventive control signal superimposed on the inputted digital image signal Si by carrying out inverse spectrum spreading by using the PN code series PS.

The inverse spread unit 511 sets a threshold value for determining whether there is established a correlation between the copying preventive control signal which has been superimposed on the image signal and spectrum-spread and the PN code series PS for inverse spreading and detects the copying preventive control signal which is spectrum-spread and superimposed on the image signal in the case where the correlation value between the spectrum-spread copying preventive control signal which is spectrum-spread and the PN signal for inverse spreading which has been obtained as a result of the inverse spreading, is larger than the set threshold value.

However, the copying preventive control signal which is superimposed on the image signal and is spectrum-spread may be deteriorated, for example, in a transmission path from the reproducing apparatus unit 30 of the inputted digital image signal Si to the recording apparatus 40 as in the case where the level of the copying preventive control signal which is to be superimposed on the inputted digital image signal and is spectrum-spread, is lowered by influence of a low pass characteristic or the like of the transmission path.

In such a case, the correlation between the copying preventive control signal which is to be superimposed on the inputted digital image signal Si and is spectrum-spread and the PN code for the inverse spreading, is lowered. In this case, the correlation value between the spectrum-spread copying preventive control signal and the PN code for the inverse spreading cannot exceed a correlation value between only an image signal component of the inputted digital image signal Si and the PN code for the inverse spreading and the copying preventive control signal which is to be superimposed cannot be detected.

Hence, when the correlation value provided as a result of the inverse spreading does not exceed the set threshold value, the inverse spreading is carried out also in respect of a successive vertical section. In this case, the correlation values which are calculated by carrying out the inverse spreading at the respective vertical sections are successively added. Also, the threshold value is set to be larger than an increase in the correlation value between only the image signal component which is increased by adding operation and the PN code for the inverse spreading and is smaller than a value produced by a threshold value in the case where the correlation value is calculated for each of the vertical sections, multiplied by several times of a number of the vertical sections which constitute an object of addition.

In this case, when the threshold value of each of the vertical sections is designated by notation Th, a number of the vertical sections which constitute the object of inverse spreading is designated by notation "n" and a correlation value between only the image signal component which has been added up to the "n"-th vertical section and the PN code for the inverse spreading is designated by notation En, a threshold value Thn in accordance with a correlation value which has been added including that of the "n"-th vertical section, is set as follows.

$$En < Thn < n \cdot Th$$

That is, in the case where the correlation value provided by carrying out the inverse spreading is successively added as mentioned above, the same code is used for the PN code in which the copying preventive control signal superimposed on the image signal is spectrum-spread and the PN code for the inverse spreading and accordingly, the correlation between the copying preventive control signal which is spectrum-spread and superimposed on the image signal and the PN code for the inverse spreading, is high.

In contrast thereto, a clear correlation is not established between the image signal component of the inputted digital image signal Si and the PN code for the inverse spreading as in the correlation between the copying preventive control signal which is spectrum-spread and is superimposed on the image signal and the PN code for the inverse spreading and the correlation is not higher than the correlation between the copying preventive control signal which is spectrum-spread and the PN code for the inverse spreading.

Accordingly, when the correlation value provided by the inverse spreading is successively added, the correlation value between the copying preventive control signal which is spectrum-spread and the PN signal for the inverse spreading becomes larger than the correlation value between the image signal component and the PN signal for the inverse spreading.

Figure 10:
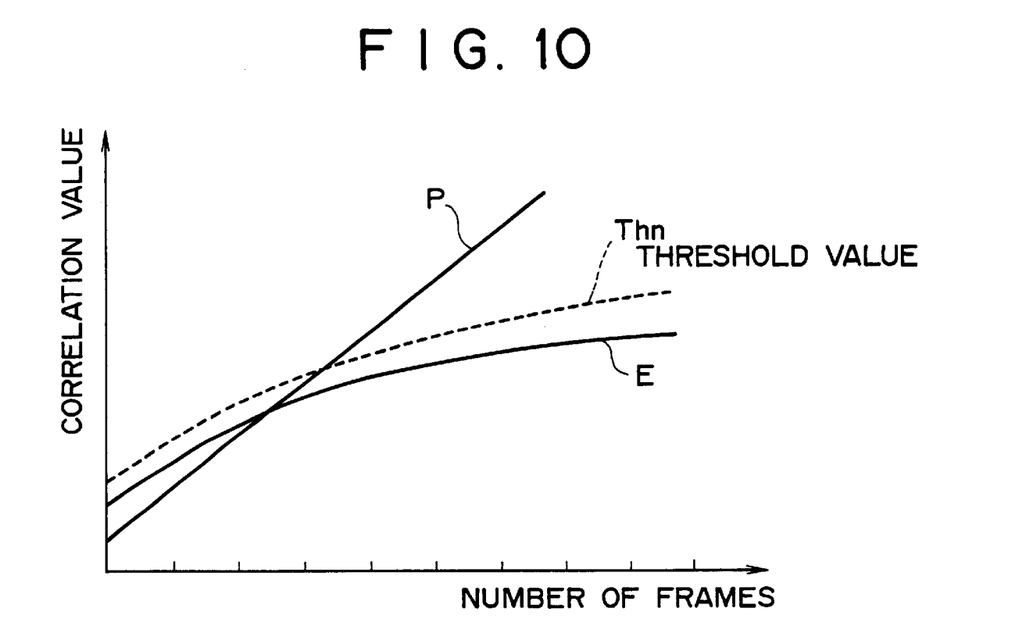
FIG. 10 is a diagram for explaining a correlation value between a spectrum spread signal obtained by inverse spectrum spreading and a spread code and a correlation value between an image signal and the spread code.

FIG. 10 is a graph showing a change P in the correlation value between the copying preventive control signal which is spectrum-spread and the PN code for the inverse spreading and a change E in the correlation value between the image signal component and the PN code for the inverse spreading in the case where the correlation value for each of the vertical sections which is obtained by carrying out the inverse spreading at each of the vertical sections, is added.

As is apparent from FIG. 10, the correlation value between the copying preventive control signal which is spectrum-spread and the PN code for the inverse spreading is steeply increased since the correlation is inherently high. In contrast thereto, the correlation between the image signal and the PN signal for the inverse spreading is not high and there is a case where components which are canceled by each other by the adding operation are included and accordingly, the increase in the correlation value is gradual.

Accordingly, as shown by FIG. 10, even in the case where the copying preventive control signal which is spectrum-spread and is superimposed on the image signal is deteriorated or the copying preventive control signal is buried in the image signal component even with the inverse spreading as described above, the copying preventive control signal which is spectrum-spread and is superimposed on the image signal can be detected by adding the correlation value obtained by the inverse spreading at respective vertical sections.

According to the example shown by FIG. 10, when the correlation value obtained as a result of the inverse spreading is added over three vertical sections, the correlation value between the copying preventive control signal which is spectrum-spread and the PN code for the inverse spreading becomes larger than the correlation value between the image signal component and the PN code for the inverse spreading and the copying preventive control signal which is spectrum-spread and is superimposed on the image signal can be detected.

Accordingly, in FIG. 10, when the threshold value Thn is set as shown by a dotted line, the copying preventive control signal which could not be detected and which is superimposed on the image signal and is spectrum-spread can be detected.

Further, although the threshold value Thn is set to be larger than an added value (increase component) of the correlation value between the image signal component and the PN signal for the inverse spreading as mentioned before, when it is set to be larger than an increase in the correlation value between the copying preventive control signal which is spectrum-spread and the PN code for the inverse spreading, the copying preventive control signal which is superimposed on the image signal cannot be detected.

Hence, the threshold value Thn is set to be smaller than n·Th which is a value of the threshold Th which is used when whether a correlation is established for each of the vertical sections is detected, multiplied by several times of the number of the vertical sections which constitute an object of addition. Thereby, there causes no inappropriate case in which the copying preventive control signal which is spectrum-spread cannot be detected although the correlation between the copying preventive control signal which is spectrum-spread and the PN code for the inverse spreading becomes higher than an increase in the correlation value between the image signal component and the PN code, by adding the correlation value provided by the inverse spreading.

That is, the threshold value Thn may be set to an intermediary value between the correlation value between the copying preventive control signal which is spectrum-spread and the PN code for the inverse spreading and the correlation value between the image signal component and the PN code for the inverse spreading.

In this way, according to the embodiment, when in the inverse spread unit 511, the copying preventive control signal which is spectrum-spread and superimposed on the inputted digital image signal Si is deteriorated and cannot be detected, the correlation value which is provided by the inverse spreading over a plurality of the vertical sections is added and the copying preventive control signal which is spectrum-spread, superimposed on the image signal and is deteriorated is detected such that an added value of the correlation value between the copying preventive control signal which is spectrum-spread and is superimposed on the image signal and the PN code for the inverse spreading becomes larger than an added value of the correlation value between the image signal component and the PN code for the inverse spreading.

In this way, in the inverse spread unit 511, the copying preventive control signal which is spectrum-spread and is superimposed on the image signal as a signal having a wide band at a very small level, is detected as the signal S51 having the original narrow band at a high level and is supplied to the data determining unit 512.

The data determining unit 512 restores the detected copying preventive control signal and supplies it to the writing control unit 42. That is, the data determining unit 512 determines content of copying control instructed by the copying preventive control signal and supplies a determination result S51 to the writing control unit 42. Thereby, writing control in accordance with the copying preventive control signal which is spectrum-spread and superimposed on the inputted digital image signal, is carried out with respect to the writing unit 41 by a writing control signal S42 from the writing control unit 42 as mentioned above.

Figure 11:
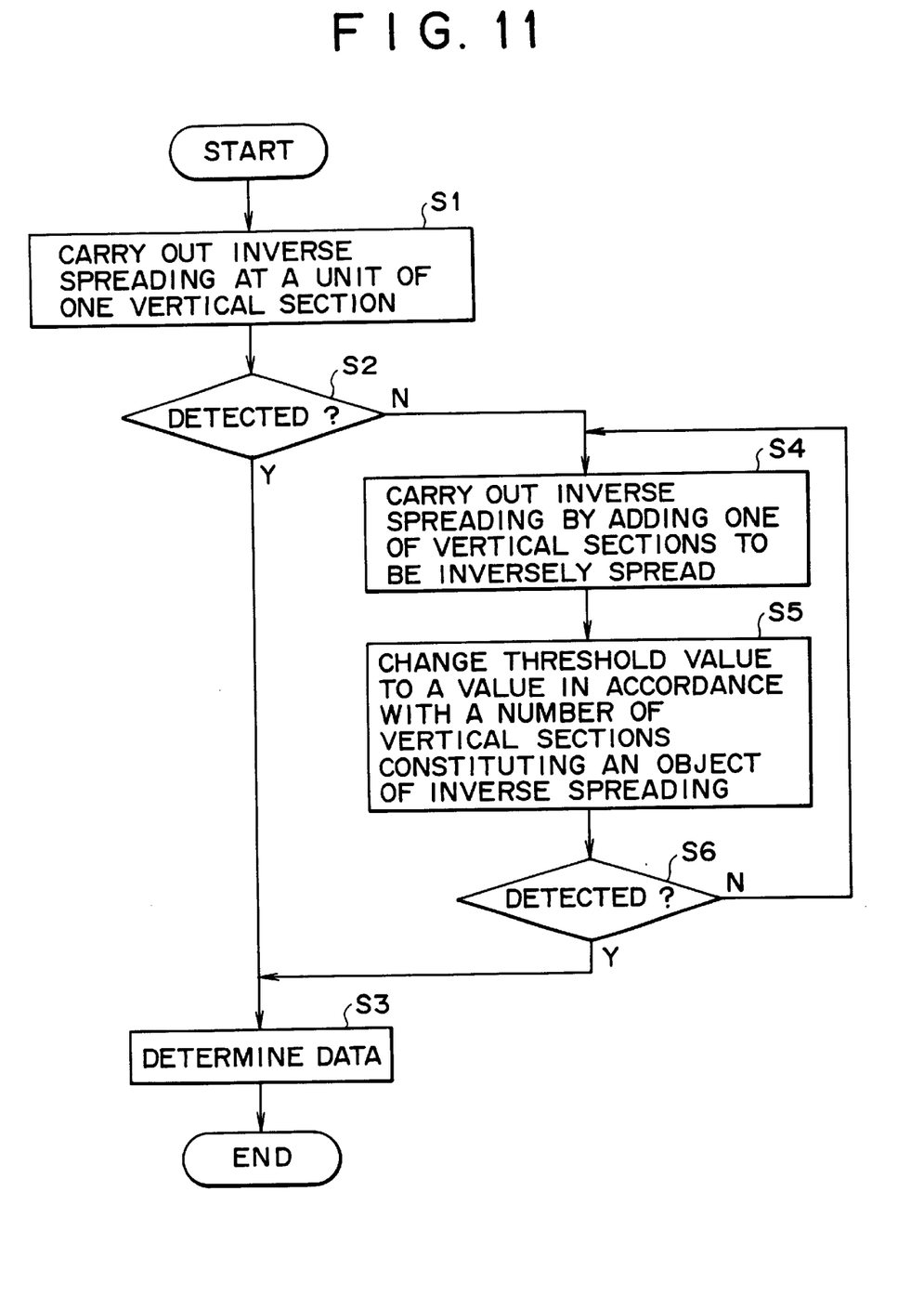
FIG. 11 is a diagram for explaining operation of essential portions according to the embodiment of FIG. 8.

Next, an explanation will be given of a processing which is carried out in the SS additional information detecting unit 51 in reference to a flowchart of FIG. 11.

When information instructing to start recording processing is provided to the recording apparatus unit 40 by, for example, a user, the inverse spread unit 511 carries out inverse spreading by a unit of one vertical section by using the PN code series PS for the inverse spreading from the PN code generating unit 512 (step S1). The operation determines whether the copying preventive control signal which is spectrum-spread and superimposed on the image signal is detected by the inverse spread processing at step S1 (step S2).

According to the processing at step S2, it is determined whether the correlation value between the copying preventive control signal which is provided as a result of the inverse spreading and which is spectrum-spread and the PN code for the inverse spreading, is detected to be at a level larger than a previously set threshold value. The threshold value is set to be at a level larger than the correlation value between only the image signal component and the PN code for the inverse spreading.

When it is determined by the determination processing at step S2 that the copying preventive control signal which is spectrum-spread and is superimposed on the image signal can be detected, the signal S51 which is the copying preventive control signal series detected by the inverse spread unit 511 is supplied to the data determining unit 512 and the original copying preventive control signal is detected (step S3).

When it is determined in step S2 that the copying preventive control signal which is spectrum-spread and is superimposed on the image signal could not be detected, the vertical section constituting the object of the inverse spreading is added by one, the inverse spreading is carried out and the obtained correlation value is successively added (step S4).

Further, the threshold value is changed in accordance with a number of the vertical sections constituting the object of inverse spread (step S5) and whether the copying preventive control signal is detected is determined by using the changed threshold value (step S6). According to the determination processing at step S6, it is determined whether the copying preventive control signal which is spectrum-spread and is superimposed on the image signal is detected by whether the level of a result of addition at step S4 is larger than the threshold value which has been changed in accordance with the number of the vertical sections constituting the object of addition of the correlated value.

When it is determined in the determination processing at step S6 that the copying preventive control signal which is spectrum-spread and is superimposed on the image signal can be detected, as mentioned above, the signal S51 which is the copying preventive control signal detected at the inverse spread unit 511 is supplied to the data determining unit 512 and the original copying preventive control signal is detected (step S3).

Further, when it is determined in the determination processing at step S6, that the copying preventive control signal which is spectrum-spread and is superimposed on the image signal cannot be detected, processings from step S4 are repeated.

As mentioned above, according to the embodiment, the copying preventive control signal which is spectrum-spread and is superimposed on the image signal can be firmly detected from the image signal even in the case where the copying preventive control signal is deteriorated by various influences as in cases where the copying preventive control signal (spectrum spread signal) which is spectrum-spread and superimposed on the image signal undergoes influence of a low pass characteristic of a transmission path or undergoes influence of image compression processing and so on.

That is, as mentioned above, by adding the correlation value obtained by the inverse spreading, the correlation value between the copying preventive control signal which is a spectrum spread signal superimposed on the image signal by being spectrum-spread and the PN code for the inverse spreading, is made higher than the correlation value between the image signal component and the PN code for the inverse spreading by which the spectrum spread signal which has been deteriorated can be detected.

Although according to above-described embodiment, the copying preventive control signal uses one series of PN code and is spectrum-spread at each vertical section and superimposed on the image signal at each vertical section, the copying preventive control signal may be spectrum-spread and is superimposed on the image signal by using spread codes which are different at every vertical section or every plurality of vertical sections, by changing series of the PN code series at every plurality of vertical sections.

In such a case, also in the recording apparatus unit 40, PN codes which are different at every vertical section or every plurality of vertical sections may be used such that PN codes in the inverse spreading coincide with those in spreading.

In such a case, the correlation between the image signal component of the image signal superimposed with the copying preventive control signal which is spectrum-spread and the PN code for the inverse spreading can further be dispersed compared with the case where one kind of PN code is used and accordingly, an increase in the correlation value between the image signal component and the PN code for the inverse spreading which is increased by adding the correlation value obtained by the inverse spreading can further be restrained.

For example, in the case where PN codes which are different at respective vertical sections are used, even when the correlation between the image signal component and the PN code for the inverse spreading is comparatively high at a certain vertical section, the PN code differs in a successive vertical section and accordingly, the correlation between the image signal component and the PN code for the inverse spreading at the vertical section becomes low and as a whole, the correlation between the image signal component and the PN code for the inverse spreading can be restrained.

In such a case, for example, in order to use PN codes which differ at respective vertical sections, two kinds of spreading may be used alternately at every vertical section or a plurality of PN codes may be changed at respective vertical sections. Naturally, even in the case where the PN code is changed at every plurality of vertical sections, two kinds of spreading may alternately be used at every plurality of vertical sections or a plurality of PN codes may be changed at every plurality of vertical sections.

Further, in this case, when different spread codes are used at every vertical section or at every plurality of vertical sections, in order to detect additional information which is spectrum-spread and is superimposed on the information signal, a plurality of kinds of spread codes must be used similar to the case of spectrum spreading and accordingly, the secrecy of the additional information which is spectrum-spread and is superimposed on the information signal can be promoted.

Further, the copying preventive control signal which is spectrum-spread is not limited to the case where it is superimposed on the image signal at every vertical section but the present invention is applicable also in the case where it is superimposed at every sporadic synchronizing period section in which one synchronizing period section is constituted by a plurality of vertical sections and it is superimposed at every plurality of vertical sections or at every other vertical section or every other plurality of vertical sections.

In such a case, as mentioned above, the correlation value provided by inverse spreading may be added and the threshold value may be changed with the synchronizing period section where the copying preventive control signal which is spectrum-spread is superimposed as an object of processing. That is, the processing of detecting the copying preventive control signal which is spectrum-spread may be carried out with only the synchronizing period section which is spectrum-spread as an object.

Further, a processing in which the additional information which is spectrum-spread and is superimposed on the information signal is detected by carrying out the inverse spreading in respect of one vertical section, and the method of the present invention in which the inverse spreading is carried out at every vertical section over a plurality of vertical sections, the correlation value obtained as a result is added and the threshold value is changed by which the additional information is spectrum-spread and superimposed on the information signal, may be carried out simultaneously and the additional information which can be detected earlier may be used.

Further, the present invention is not limited to the case where the vertical synchronizing signal is used as a reference signal and one vertical section or a plurality of vertical sections constitute a synchronizing period section but, naturally, a horizontal synchronizing signal may be used as a reference signal and one horizontal section or a plurality of horizontal sections may constitute one synchronizing period section.

Further, although an explanation has been given of an example in the case where the main information signal is the image signal, the main information signal is not limited to the image signal. In the case of information signal having an accompanied synchronizing signal, the information signal may constitute the main information signal according to the present invention.

Further, although an explanation has been given of the case where the main information signal is a digital signal, the main information signal according to the present invention can be constituted even when the main information signal is an analog signal.

Further, the additional information is not limited to the copying preventive control signal as in the above-described example but any information may be used so far as it is copyright information or other information which is intended to transmit along with the main information signal and which is not intended to detach easily.

Further, the present invention is not limited to the case where the additional information is spectrum-spread by using the spread code such as PN code or the like and is superimposed on the main information signal but the present invention is applicable to the case where the spread code per se such as PN code or the like is superimposed on the main information signal as additional information and the PN code is detected. That is, the present invention is applicable also in the case where copying control of information signal is carried out by whether the spread code is superimposed and several kinds of the spread codes can be superimposed on the information signal and information is informed in accordance with kinds of the detected spread code.

Further, as mentioned above, the present invention in which the inverse spreading is carried out for each of the synchronizing periods over a plurality of the synchronizing period sections, the correlation value obtained as a result is added and the threshold value is changed, may be implemented not only in the case where the inverse spreading is carried out at every synchronizing period or every plurality of synchronizing periods as in one vertical section or a plurality of vertical sections and the additional information which is spectrum-spread and is superimposed on the information signal is detected but also in the case where, for example, the additional information which is spectrum-spread and superimposed cannot be detected even after carrying out the inverse spreading in respect of one synchronizing period section.

Further, in the case where it is known that additional information which is spectrum-spread and is superimposed on the information signal can be detected by, for example, the addition processing as mentioned above and the processing of changing the threshold of three vertical sections by an experiment or the like, the addition of the correlation value which is obtained by the inverse spreading and the change of the threshold value are carried out from the start, at every vertical section, over three vertical sections by which additional information can be detected.

Further, although an explanation has been given of the case where the spectrum spread signal is detected from a reproducing signal from a disc where information signal superimposed with the spectrum spread signal is recorded, the present invention is applicable in the case where additional information is spectrum spread on a broadcast signal of ground wave broadcast, satellite broadcast, cable television broadcast or the like and is transmitted, and the spectrum spread signal is detected from the broadcast signal.

Further, the spread code used in the spectrum spreading is not limited to the PN code but, for example, a gold code or other spread code may be used.

What is claimed is:

1. A method of detecting a spectrum spread additional information signal superimposed on a main information signal, in which the additional information signal is formed by spectrum-spreading additional information using a spread code generated in synchronism with a synchronizing signal of the main information signal, the method comprising the steps of:

generating a second spread code which is the same as the spread code used in the spectrum spreading in synchronism with the synchronizing signal included in the main information signal having the additional information;

forming a correlation value by subjecting the main information signal having the additional information to inverse spectrum spreading using the second spread code;

comparing the correlation value with a predetermined threshold level;

detecting the additional information signal from the main information signal with the additional information when the correlation value is larger than the predetermined threshold level; and adding the successive correlation values at every period during a plurality of periods of the second spread code when the correlation value is detected in said step of detecting to be smaller than the predetermined threshold level, increasing the threshold level from the predetermined threshold level by a predetermined amount of increase at every period of the spread code and detecting the additional information signal from the main information signal having the additional information when the added correlation value becomes larger than the increased threshold level.

2. The method of detecting a spectrum spread signal according to claim 1, wherein when the correlation value is smaller than the predetermined threshold level, the predetermined amount of increase of the threshold level at every period of the spread code is made larger than an amount of increase of a correlation value between the spread code and the main information signal.

3. The method of detecting a spectrum spread signal according to claim 1, wherein the increased threshold level is smaller than a total value obtained by adding the predetermined threshold levels over the plurality of periods of the spread signal.

4. The method of detecting a spectrum spread signal according to claim 1, wherein the spread code used in the spectrum-spreading includes codes which are different at every period during a plurality of periods of the main information signal.

5. The method of detecting a spectrum spread signal according to claim 1, wherein the main information signal is an image signal.

6. The method of detecting a spectrum spread signal according to claim 1, wherein the additional information signal is a signal for controlling the main information signal to be recorded on a record medium.

7. An apparatus for detecting a spectrum spread additional information signal superimposed on a main information signal, in which the additional information signal is formed by spectrum-spreading additional information using a spread code generated in synchronism with a synchronizing signal of the main information signal, the apparatus comprising:

spread code generating means for generating a second spread code which is the same as the spread code used in the spectrum-spreading in synchronism with the synchronizing signal included in the main information signal having additional information;

inverse spectrum spreading means for forming a correlation value by spectrum-spreading the main information signal having the additional information using the second spread code from the spread code generating means;

comparing means for comparing the correlation value with a predetermined threshold level; and detecting means for detecting the additional information signal from the main information signal having the additional information when an added value of the correlation value is larger than an increased value of the predetermined threshold level, wherein the added value is formed, by adding successive correlation values at every period during a plurality of periods of the spread code, and increasing the threshold level from the predetermined threshold level by a predetermined amount of increase at every period of the spread code when the correlation value is smaller than the threshold level.

8. The apparatus for detecting a spectrum spread signal according to claim 7, wherein when the correlation value is smaller than the predetermined threshold level, the detecting means raises the amount of increase of the threshold level at every period of the spread code more than an amount of increase of the correlation value between the spread code and the main information signal.

9. The apparatus for detecting a spectrum spread signal according to claim 7, wherein the detecting means makes the increased threshold level smaller than a total value obtained by adding the predetermined threshold levels by the plurality of periods of the spread signal.

10. The apparatus for detecting a spectrum spread signal according to claim 7, wherein the spread code used in spectrum-spreading includes codes which differ at every one of every plurality of periods of the main information signal.

11. The apparatus of detecting a spectrum spread signal according to claim 7, wherein the main information signal is an image signal.

12. The apparatus of detecting a spectrum spread signal according to claim 7, wherein the additional information signal is a signal for controlling to record the main information signal on a record medium.

* * * * *